US007410201B1

(12) United States Patent
Wilson et al.

(10) Patent No.: US 7,410,201 B1
(45) Date of Patent: Aug. 12, 2008

(54) ACTUATOR STRUCTURE AND METHOD FOR ATTACHING A GEAR OR PULLEY TO LEAD SCREW

(75) Inventors: Daryl Wilson, Ypsilanti, MI (US); Scott L. Strong, Manchester, MI (US)

(73) Assignee: Dana Automotive Systems Group, LLC, Toledo, OH (US)

( * ) Notice: Subject to any disclaimer, the term of this patent is extended or adjusted under 35 U.S.C. 154(b) by 729 days.

(21) Appl. No.: 10/976,951

(22) Filed: Oct. 29, 2004

(51) Int. Cl.
*B60J 7/00* (2006.01)
*E05F 11/34* (2006.01)
*E06B 3/32* (2006.01)

(52) U.S. Cl. .................. 296/146.16; 49/362; 74/89.14; 254/98; 187/267

(58) Field of Classification Search ............ 296/146.16; 49/362, 425; 74/89.15; 187/267; 254/98
See application file for complete search history.

(56) References Cited

U.S. PATENT DOCUMENTS

| | | | |
|---|---|---|---|
| 3,893,260 | A | 7/1975 | Cadiou |
| 3,975,968 | A | 8/1976 | Chaffin |
| 4,721,337 | A | 1/1988 | Tomita |
| 4,920,698 | A | 5/1990 | Friese et al. |
| 4,995,195 | A | 2/1991 | Olberding et al. |
| 5,150,872 | A | 9/1992 | Isomura |
| 5,209,194 | A | 5/1993 | Adachi et al. |
| 5,557,888 | A | 9/1996 | Ruchat et al. |
| 5,613,402 | A | 3/1997 | Gauger et al. |
| 5,639,191 | A | 6/1997 | Womack |
| 5,673,659 | A | 10/1997 | Regueiro |
| 5,737,135 | A | 4/1998 | Chan |
| 5,787,644 | A | 8/1998 | Thomsen, Jr. |
| 6,038,819 | A | 3/2000 | Klein |
| 6,119,402 | A | 9/2000 | Wisner |
| 6,125,585 | A | 10/2000 | Koneval et al. |
| 6,234,034 | B1 | 5/2001 | Ando |
| 6,256,930 | B1 | 7/2001 | Faubert et al. |
| 6,282,970 | B1 | 9/2001 | Oakley |
| 6,324,789 | B1 | 12/2001 | Stephen |
| 6,481,161 | B1 | 11/2002 | Thurnher |
| 6,533,082 | B2 | 3/2003 | Gill et al. |
| 6,655,092 | B2 | 12/2003 | Pacella et al. |
| 2004/0020131 | A1 | 2/2004 | Galer et al. |

*Primary Examiner*—Joseph D Pape
(74) *Attorney, Agent, or Firm*—Dykema Gossett PLLC

(57) ABSTRACT

An improved lead screw actuator for use in applications including power vehicle windows is provided that significantly reduces the amount of machining that must be performed on the lead screw to enable secure attachment of a gear or pulley. The lead screw has a plurality of threads on its outer annular surface and a first and second axially spaced circumferential groove. A gear or pulley disposed about the lead screw has a female thread formed into an inner annular surface that is configured to engage at least one of the plurality of threads of the lead screw between the first and second grooves. A pair of rings are disposed within the first and second grooves in order to restrict axial movement of the gear or pulley on the lead screw.

20 Claims, 3 Drawing Sheets

ACTUATOR STRUCTURE AND METHOD FOR ATTACHING A GEAR OR PULLEY TO LEAD SCREW

BACKGROUND OF THE INVENTION

1. Field of the Invention

The present invention relates to lead screw actuators and, in particular, to the connection of a driven member such as a gear or pulley to the lead screw.

2. Discussion of Related Art

Conventional methods for attaching gears or pulleys to a lead screw include a press-fit relationship, keying, splining, pinning or the use of set pins or set screws. Each of these methods requires significant machining of the lead screw that increases the cost of the actuator and products incorporating the actuator.

The inventors herein have recognized a need for a lead screw actuator and a method for attaching a driven member to a lead screw that will minimize and/or eliminate the above-identified deficiencies.

SUMMARY OF THE INVENTION

The present invention provides an actuator for use in a vehicle window assembly or other applications. The actuator includes a motor having an output shaft extending therefrom and a lead screw disposed about an axis of rotation. The lead screw has a plurality of threads and defines first and second axially spaced circumferential grooves. A driven member such as a gear or pulley is rotatably driven by the motor shaft and is disposed about the lead screw. The driven member has a female thread formed into an inner annular surface of the driven member that is configured to engage one of the plurality of threads of the lead screw between the first and second grooves. First and second rings are disposed within the first and second grooves.

An actuator in accordance with the present invention is advantageous as compared to existing lead screw actuators. In particular, the inventive actuator structure and method enables a driven member such as a gear or pulley to be securely attached to the lead screw without requiring significant machining of the lead screw.

These and other features and objects of this invention will become apparent to one skilled in the art from the following detailed description and the accompanying drawings illustrating features of this invention by way of example.

DETAILED DESCRIPTION OF EMBODIMENTS OF THE INVENTION

Figure 1:
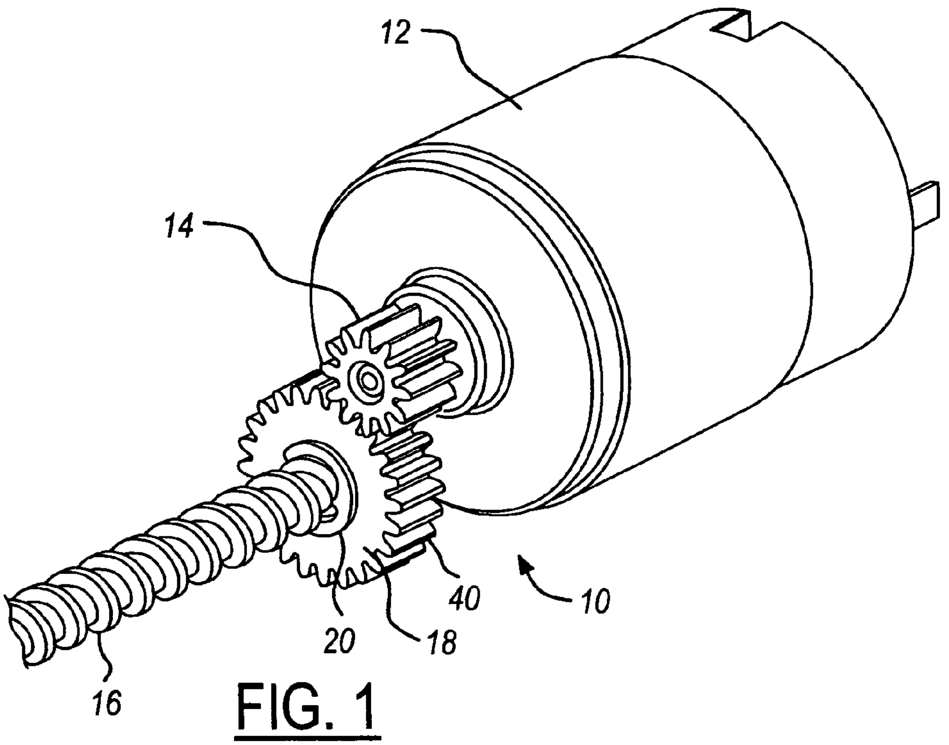
FIG. 1 is a perspective view of an actuator in accordance with one embodiment of the present invention.
Figure 2:
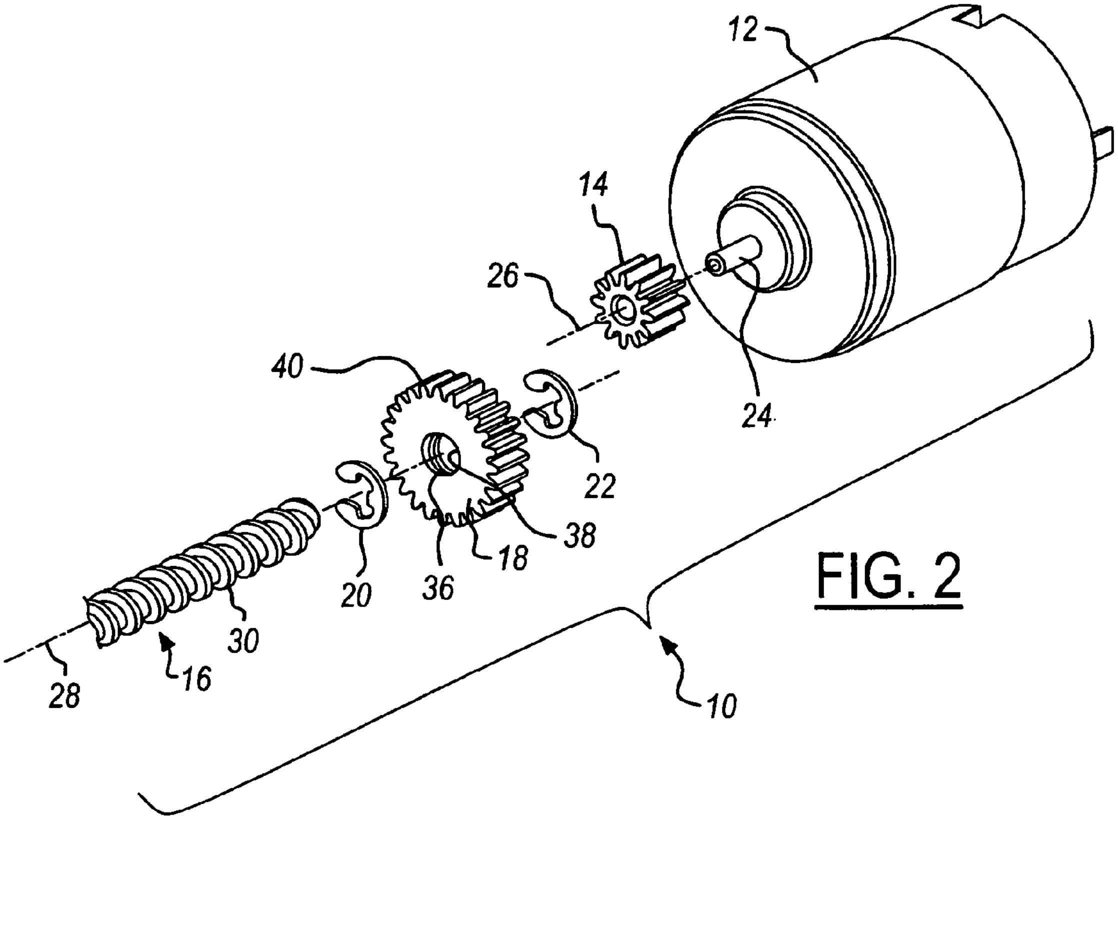
FIG. 2 is an exploded perspective view of the actuator of FIG. 1.
Figure 3:
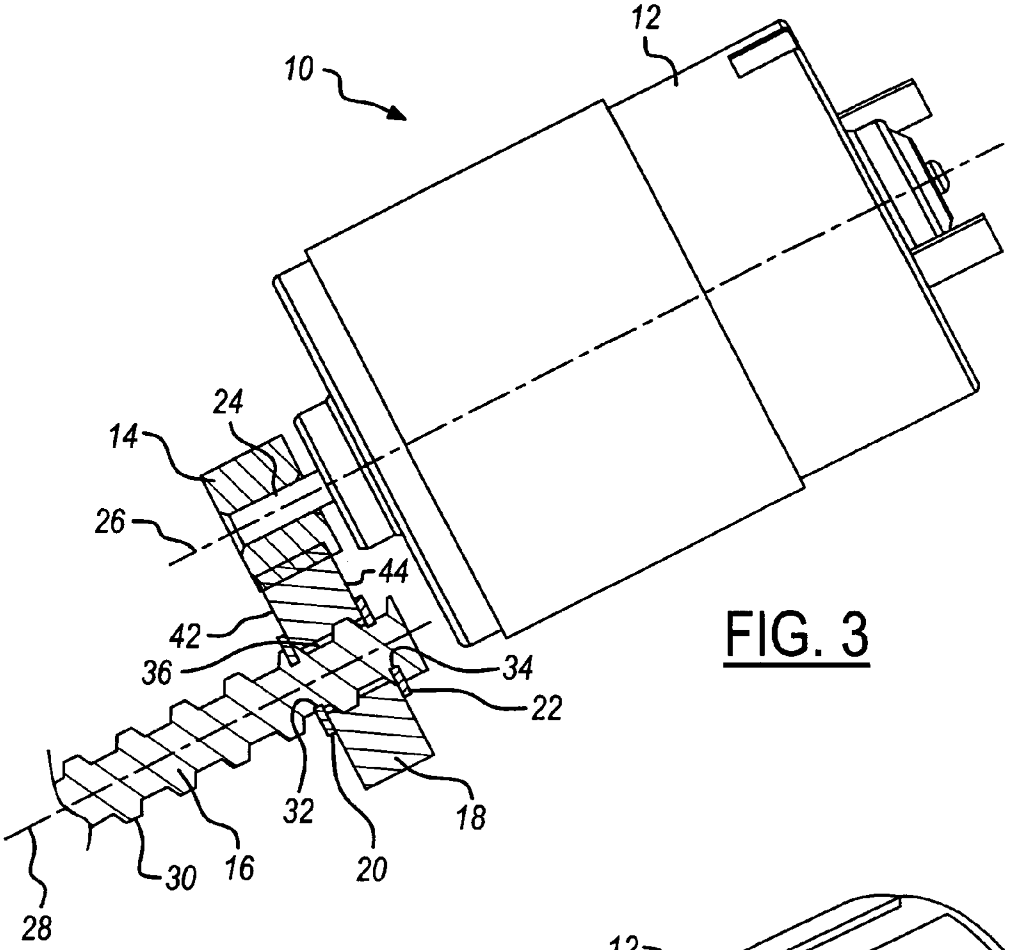
FIG. 3 is a cross-sectional view of the actuator of FIG. 1.

Referring now to the drawings wherein like reference numerals are used to identify identical components in the various views, FIGS. 1-3 illustrate a perspective view of an actuator 10 in accordance with one embodiment of the present invention. Actuator 10 is provided for use in a vehicle window assembly as discussed in greater detail hereinbelow. It should be understood, however, that actuator 10 may find use in a wide variety of applications. Actuator 10 may include a motor 12, a pinion gear 14, a lead screw 16, a driven member 18 and rings 20, 22.

Motor 12 is provided as a power source. Motor 12 is conventional in the art and may comprise an electric motor. As best shown in FIG. 2, motor 12 may have an output shaft 24 extending therefrom. Output shaft 24 is disposed about an axis of rotation 26. Output shaft 24 is provided to rotatably drive pinion gear 14.

Pinion gear 14 is provided to drive and transfer torque from output shaft 24 to driven member 18. Pinion gear 14 is conventional in the art and may be made from conventional plastic, metal and metal alloys. Pinion gear 14 is disposed about output shaft 24. The teeth on pinion gear 14 engage corresponding teeth on driven member 18.

Lead screw 16 translates rotary motion into linear motion to cause linear movement of an object such as a vehicle window. Lead screw 16 may be made from conventional metal and metal alloys. Lead screw 16 is disposed about an axis of rotation 28 that is different from the axis of rotation 26 of the motor output shaft 24. Lead screw 16 has a plurality of circumferential threads 30. As best illustrated in FIG. 3, lead screw 16 also defines a pair of grooves 32, 34.

Grooves 32, 34 are provided to receive rings 20, 22. Grooves 32, 34 extend around at least a portion of the circumference of lead screw 16 and are axially spaced from one another. The axial spacing between grooves 32, 34 may be determined by the size of driven member 18 to be disposed about lead screw 16.

Driven member 18 is provided to transfer torque from pinion gear 14 to lead screw 16. Driven member 18 may be made from conventional plastics, metals or metal alloys. Member 18 is disposed about lead screw 16 for rotation about axis 28. Referring to FIG. 2, driven member 18 has a female thread 36 formed into an inner annular surface 38 of driven member 18. The female thread 36 may be tight fit and may be molded into the inner annular surface 38. As best illustrated in FIG. 3, the female thread 36 of member 18 may be configured to engage one or more of the plurality of threads 30 of lead screw 16 such that member 18 can be screwed onto the lead screw 16 to a predetermined point between grooves 32, 34. In the embodiment of FIGS. 1-3, driven member 18 comprises a gear and has a plurality of teeth 40 configured to engage corresponding teeth on pinion gear 14.

Rings 20, 22 are provided to position and retain driven member 18 on lead screw 16. Rings 20, 22 are conventional in the art and may be made of conventional metal or metal alloys. Rings 20, 22 may comprise snap rings such as basic snap rings, bowed snap rings, bevel snap rings, or crescent rings As best illustrated in FIG. 2, rings 20, 22 may comprise substantially E-shaped rings (known as "E-Rings" within the art) with the opening and inner surface configured so as to allow rings 20, 22 to snap onto lead screw 16. The inner surface of rings 20, 22 is irregularly shaped with two notches and a center boss. Rings 20, 22 are disposed on either side of driven member 18 within grooves 32, 34 of lead screw 16. Rings 20, 22 may be of a thickness so as to be disposed within grooves 32, 34 so that rings 20, 22 do not move axially within grooves 32, 34. As best illustrated in FIG. 3, one axial side 42 of ring 20 faces and may abut one axial side of member 18 while one axial side 44 of ring 22 faces and may abut an opposite axial side of member 18.

Figure 4:
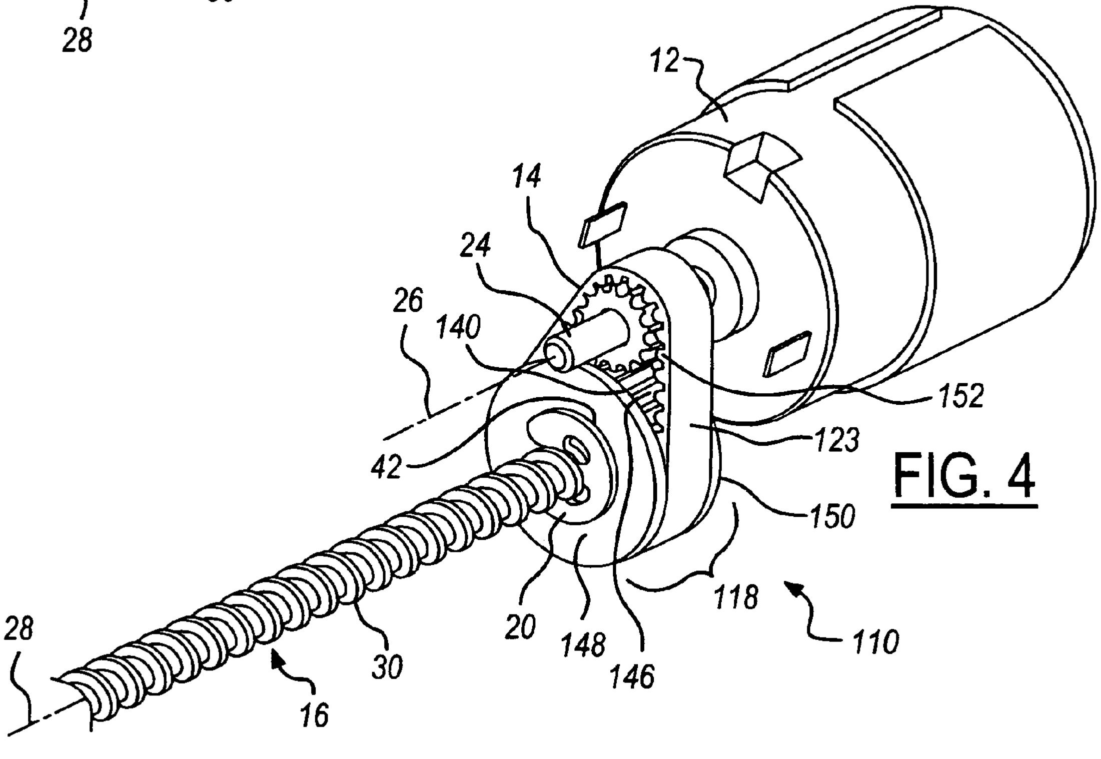
FIG. 4 is a perspective view of a structure in accordance with another embodiment of the present invention.

Referring now to FIG. 4, an actuator 110 in accordance with another embodiment of the present invention is illustrated. Actuator 110 is provided for use in a vehicle window assembly. It should again be understood, however, that actuator 110 may find use in a wide variety of applications. Actuator 110 is substantially similar to actuator 10. Accordingly, identical components will be identified by the same reference numbers used in the illustrations for actuator 10 and a description of these components may be found above. Actuator 10 may include a motor 12, a pinion gear 14, a lead screw 16, a driven member 118 and rings 20, 22. Although a pinion gear 14 is shown in the illustrated embodiment, it should be understood that pinion gear 14 could alternatively comprise a cog or pulley. Actuator 110 may also include a belt 123.

Driven member 118 is provided to transfer torque from belt 123 to lead screw 16. Driven member 118 may again be made from conventional plastics, metals or metal alloys and member 118 is disposed about lead screw 16 for rotation about axis 28. Member 118 defines a female thread 36 formed into an inner annular surface 138 of driven member 118. The female thread 36 may be tight fit and may be molded into the inner annular surface 138. The female thread 36 may be configured to engage one or more of the plurality of threads 30 of lead screw 16 such that member 118 can be screwed onto lead screw 16 to a predetermined point between grooves 32, 34. In the embodiment illustrated in FIG. 4, driven member 118 comprises a pulley. Member 118 may include an annular central body 146 and axially spaced discs 148, 150. Body 146 may include a plurality of teeth 140 disposed on a radially outer surface configured to engage belt 123. Teeth 140 may be disengaged from the teeth on pinion gear 14. Discs 148, 150 may have an outer diameter greater than body 146 and may form a valley with body 146 in which belt 123 may be disposed. Discs 148, 150 may be integral with body 146 forming a unitary member. It should be understood that similar discs may be used on pinion gear 14 in place of, or in addition to, discs 148 150 on driven member 118 or that, alternatively, each of pinion gear 14 and driven member 118 may include a single disc such that belt 123 is retained thereon. Upon assembly, one axial side 42 of ring 20 faces and may abut one axial side of member 118 while one axial side 44 of ring 22 faces and may abut an opposite axial side of member 118.

Belt 123 is provided to transfer torque from gear 14 to driven member 118. Belt 123 may be made from conventional materials and may include a plurality of threads 152 on one side configured for engagement with corresponding teeth formed in gear 14 and member 118. In the illustrated embodiment, belt 123 is a micro-cog belt. Belt 123 may alternatively comprise a flat belt or v-belt with pinion gear 14 and driven member 118 having corresponding mating surfaces.

Figure 5:
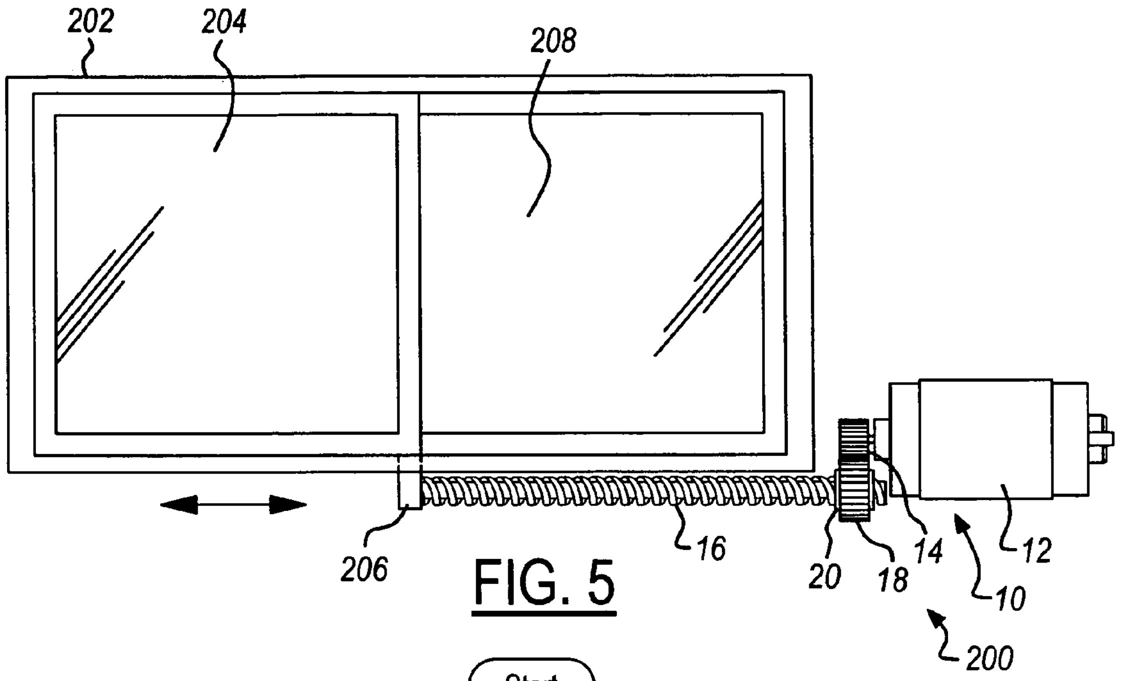
FIG. 5 is a side view of a vehicle window assembly incorporating the actuator of FIGS. 1-3.

Referring to FIG. 5 a vehicle window assembly 200 incorporating an actuator 10 in accordance with the present invention is illustrated. It should be understood that assembly 200 could alternatively include actuator 110. Assembly 200 may include a frame 202, a window pane 204, and a nut 206, in addition to actuator 10.

Frame 202 defines an aperture 208 through which air or other materials or objects may pass. Frame 202 and aperture 208 may be rectilinear in shape, but it should be understood that the shape of frame 202 and aperture 208 may vary.

Window pane 204 closes and at least partially opens aperture 208. Window pane 204 is movable within frame 202 and may move by sliding horizontally within frame 202. More particularly, window pane 204 may slide horizontally within a track (not shown) defined in frame 202. Window pane 204 may move from a first position in which the aperture 208 of frame 202 is closed to a second position in which the aperture 208 of frame 202 is at least partially open. Window pane 204 may also be disposed in any intermediate position during its movement from a position in which aperture 208 is closed to a position in which aperture 208 is fully open.

Nut 206 is provided to couple pane 204 to lead screw 16 of actuator 10 or actuator 110. Nut 206 is disposed on lead screw 16 and may be horizontally displaceable along lead screw 16 responsive to rotation of lead screw 16. Nut 206 may be attached to pane 204 in a variety of ways (e.g., a groove may be formed in nut 206 to receive pane 202).

Figure 6:
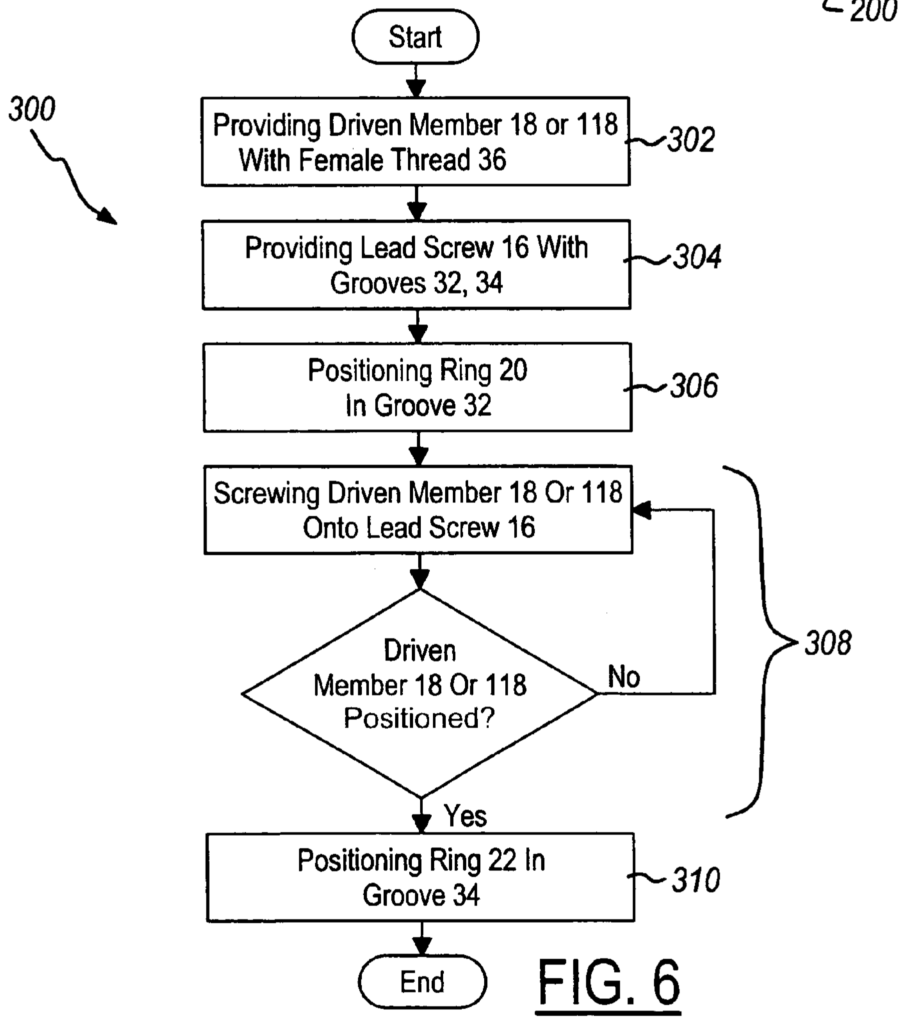
FIG. 6 is a flow chart illustrating a method for attaching a driven member to a lead screw in accordance with the present invention.

Referring now to FIG. 6, a method 300 of attaching a driven member 18 or 118 to a lead screw 16 is described. The method may begin with the step 302 of providing the driven member 18 or 118 with a female thread 36 formed into an inner annular surface 38 or 138 of the driven member 18 or 118. The method may continue with the step 304 of providing the lead screw 16 with grooves 32, 34 in an outer annular surface of the lead screw 16. Step 304 may be accomplished through a relatively simple machining operation. The method may continue with the step 306 of positioning a ring 20 in groove 32 of lead screw 16. The method may further include the step 308 of screwing driven member 18 or 118 onto lead screw 16 such that one axial side 42 of driven member 18 or 118 faces or even abuts ring 20. Finally, the method may include the step 310 of positioning ring 22 in groove 34 of lead screw 16 such that ring 22 faces or even abuts side 44 of driven member 18 or 118.

An actuator in accordance with the present invention is advantageous as compared to conventional lead screw actuators. In particular, the inventive actuator enables secure positioning of a gear or pulley on the lead screw without significant machining of the lead screw.

While the invention has been particularly shown and described with reference to the preferred embodiments thereof, it is well known by those skilled in the art that various changes and modifications can be made in the invention without departing from the spirit and scope of the invention.

We claim:

1. An actuator, comprising:

a motor having an output shaft extending therefrom;

a lead screw disposed about an axis of rotation, said lead screw having a plurality of threads and said lead screw defining first and second axially spaced circumferential grooves;

a driven member rotatably driven by said motor shaft and disposed about said lead screw, said driven member having a female thread formed into an inner annular surface of said driven member and configured to engage one of said plurality of threads of said lead screw between said first and second grooves; and, first and second rings disposed within said first and second grooves.

2. The actuator of claim 1 wherein said driven member comprises a gear.

3. The actuator of claim 2 further comprising a pinion gear disposed about said output shaft, said pinion gear having a plurality of teeth formed into an outer annular surface of said pinion gear and configured to engage a corresponding plurality of teeth on an outer surface of said driven member.

4. The actuator of claim 1 wherein said driven member comprises a pulley.

5. The actuator of claim 4, further comprising:
a pinion gear disposed about said output shaft; and,
a belt disposed about said pinion gear and said pulley
wherein said pinion gear and said pulley each have a plurality of teeth on radially outer surfaces of said pinion gear and pulley, respectively, and said belt includes a plurality of teeth on one side of said belt configured to engage said plurality of teeth on said pinion gear and said plurality of teeth on said pulley.

6. The actuator of claim 5 wherein said plurality of teeth on said pinion gear are disengaged from said plurality of teeth on said pulley.

7. The actuator of claim 4 wherein said pulley comprises:
a annular body having a plurality of teeth disposed on a radially outer surface; and,
first and second discs disposed on opposite axial ends of said body, said first and second discs having a larger outer diameter than said annular body.

8. The actuator of claim 1 wherein said axis of rotation of said lead screw is different than an axis of rotation of said output shaft.

9. The actuator of claim 1 wherein a first axial side of said driven member abuts one axial side of said first ring and a second axial side of said driven member abuts one axial side of said second ring.

10. A method for attaching a driven member to a lead screw, comprising the steps of:
(a) providing said driven member with a female thread formed into an inner annular surface of said driven member;
(b) providing said lead screw with first and second grooves in an outer annular surface of said lead screw;
(c) positioning a first ring in said first groove of said lead screw;
(d) screwing said driven member onto said lead screw so that a first axial side of said driven member faces said first ring; and
(e) positioning a second ring in said second groove of said lead screw wherein said second ring faces a second axial side of said driven member.

11. The method of claim 10 wherein said driven member comprises a gear.

12. The method of claim 10 wherein said driven member comprises a pulley.

13. A vehicle window assembly, comprising:
a frame defining an aperture;
a window pane movable within said frame to close and at least partially open said aperture;
a motor having an output shaft extending therefrom;
a lead screw disposed about an axis of rotation, said lead screw having a plurality of threads and said lead screw defining first and second axially spaced circumferential grooves;
a driven member rotatably driven by said motor shaft and disposed about said lead screw, said driven member having a female thread formed into an inner annular surface of said driven member and configured to engage one of said plurality of threads of said lead screw between said first and second grooves;
first and second rings disposed within said first and second grooves; and,
a nut disposed about said lead screw and attached to said window pane.

14. The actuator of claim 13 wherein said driven member comprises a gear.

15. The actuator of claim 14 further comprising a pinion gear disposed about said output shaft, said pinion gear having a plurality of teeth formed into an outer annular surface of said pinion gear and configured to engage a corresponding plurality of teeth on an outer surface of said driven member.

16. The actuator of claim 13 wherein said driven member comprises a pulley.

17. The actuator of claim 16, further comprising:
a pinion gear disposed about said output shaft; and,
a belt disposed about said pinion gear and said pulley
wherein said pinion gear and said pulley each have a plurality of teeth on radially outer surfaces of said pinion gear and pulley, respectively, and said belt includes a plurality of teeth on one side of said belt configured to engage said plurality of teeth on said pinion gear and said plurality of teeth on said pulley.

18. The actuator of claim 16 wherein said pulley comprises:
a annular body having a plurality of teeth disposed on a radially outer surface; and,
first and second discs disposed on opposite axial ends of said body, said first and second discs having a larger outer diameter than said annular body.

19. The actuator of claim 13 wherein said axis of rotation of said lead screw is different than an axis of rotation of said output shaft.

20. The actuator of claim 13 wherein a first axial side of said driven member abuts one axial side of said first ring and a second axial side of said driven member abuts one axial side of said second ring.

* * * * *